Figure 1:
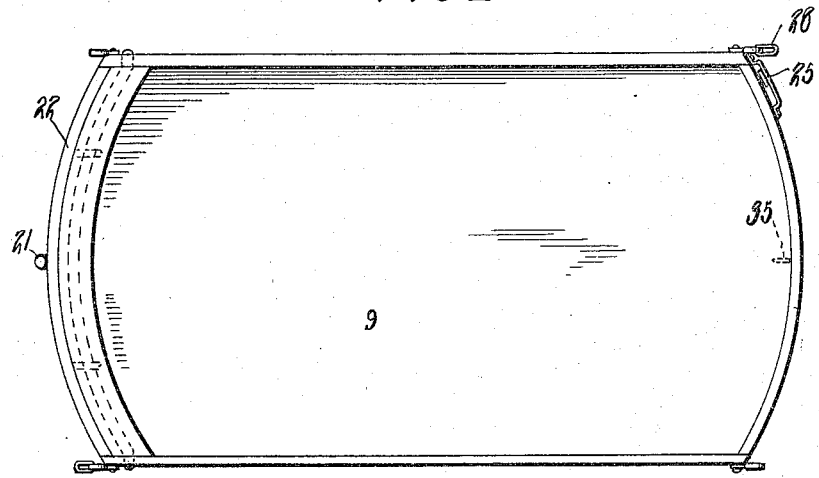

M. S. RUNSVOLD.
MINE CAR.
APPLICATION FILED SEPT. 7, 1917.

1,276,418.

Patented Aug. 20, 1918.
2 SHEETS—SHEET 1.

WITNESSES
W. C. Fielding
Dwight R. Law

INVENTOR
Martin S. Runsvold
BY Richard B. Owen
ATTORNEY

M. S. RUNSVOLD.
MINE CAR.
APPLICATION FILED SEPT. 7, 1917.
1,276,418.
Patented Aug. 20, 1918.
2 SHEETS—SHEET 2.
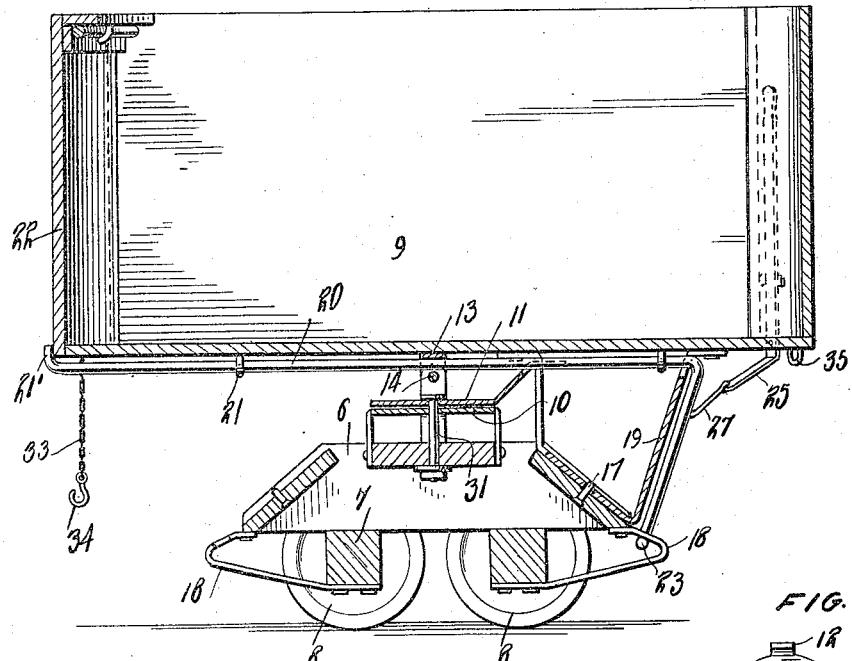
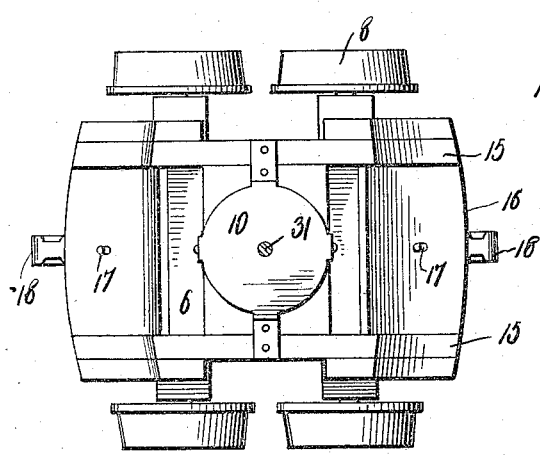
INVENTOR
Martin S. Runsvold
WITNESSES
ATTORNEY

UNITED STATES PATENT OFFICE.

MARTIN S. RUNSVOLD, OF BISBEE, ARIZONA.

MINE-CAR.

1,276,418.

Specification of Letters Patent.

Patented Aug. 20, 1918.

Application filed September 7, 1917. Serial No. 190,211.

*To all whom it may concern:*

Be it known that I, MARTIN S. RUNSVOLD, a citizen of the United States, residing at Bisbee, in the county of Cochise and State of Arizona, have invented certain new and useful Improvements in Mine-Cars, of which the following is a specification.

This invention relates generally to cars, and particularly to cars for use in mining and excavating operations.

The primary object of the invention is to provide a car of this character which is capable of being quickly and easily dumped and reset, and which has its body so arranged as to be capable of being dumped in a number of different directions.

A further object of the invention is to provide a dump car of the character set forth which can be dumped without in any way disturbing the truck, and which involves an improved means for locking the body against rotary or dumping movement.

A still further object of the invention is to provide a dump car which has its body constructed in such manner as to enable a number of such cars to be coupled together to form a train, and the cars are connected in such manner as to obviate the opportunity of the same to become derailed when the train is rounding sharp curves.

With these objects in view, together with others which will appear as the description proceeds, the invention resides in the novel formation, combination, and arrangement of parts, all as will be described more fully hereinafter, illustrated in the drawings, and particularly pointed out in the claims.

In the drawings:—

Figure 2:
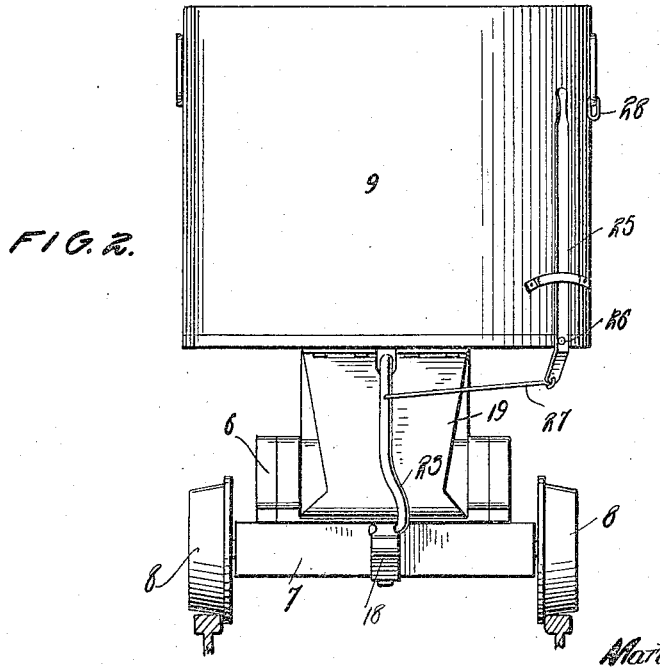

Figure 1 is a top plan view of a dump car constructed in accordance with this invention, Fig. 2 is a front elevation of the said car, Fig. 3 is a longitudinal sectional view taken through the car body and the truck therefor, Fig. 4 is a sectional plan view of the truck structure, and Fig. 5 is a plan view of the fifth wheel for supporting the car body.

Referring now particularly to the drawings, 6 represents the truck upon which the body of the dump car is mounted, and this truck includes the supporting axles or bolsters 7, upon which the wheels 8 are mounted. The car body indicated generally at 9, is rotatably mounted upon the truck at the center thereof, and is also capable of rocking vertically.

The truck 6 is provided with an upstanding centrally arranged fifth wheel plate 10 upon which is rotatably mounted a second fifth wheel plate indicated at 11, the latter plate being adapted to support the body of the vehicle. The plate 11 is provided with a pair of diametrically opposite upstanding ears 12, which are adapted to coöperate with the depending ears formed at the extremities of a laterally disposed strap member 13 on the bottom of the car body; a pin 14 being employed to hold the ears 12 and 13 in proper assembled relation. This construction permits of the body being readily rocked vertically so as to dump.

The forward and rear laterally disposed plates at the ends of the truck 6 are inclined upwardly and inwardly and each is provided adjacent its ends with upstanding stop members 15, the said stops between them forming a channel 16. Each of the said end plates is provided with a centrally arranged upstanding pin 17, and the said plates are held rigidly in the truck frame by strap members or braces 18 connected at their inner ends to the bolsters or axles 7.

The car body 9 has depending from one end thereof a foot 19, the lower end of which is inclined upwardly and inwardly corresponding with the inclination of the end plate of the truck. This foot is of a width equal to the distance between the upstanding portions 15 upon the truck plate, so as to snugly fit between the same. The foot is also provided with a central aperture as shown particularly in Fig. 3 of the drawings, the said aperture being adapted to receive the pin 17 in one of the opposing truck plates. The foot is so arranged that when it is within the recess or channel 16, the car will be held in proper horizontal position, and when it is desired to rotate the car body, one end thereof may be depressed, whereupon the foot 19 will be raised from engagement with the pin 17 and out of the channel 16. As soon as the sides of the foot have cleared the stop 16, the said body may be rotated.

Associated with a car body and truck of this character is an improved locking means, the same in the present instance comprising an elongated bar or rod 20 rotatably mounted in suitable keepers 21 upon the bottom of the car body, and extends longitudinally and centrally thereof. One end of the rod projects beyond the corresponding edge of the car body 9, and is bent upwardly to provide a catch portion 21' adapted to engage with the lower edge of the end gate 22 of the car body to hold the same against being opened. The opposite end of the bar or rod 20 extends downwardly and inwardly to provide a latch portion 23 for engagement within the loops formed by the strap members 18 at each end of the truck. When the bar is in the position shown in Fig. 3, the door 22 will be held against being opened, and the portion 23 will be engaged within the loop 18 to prevent the body from being rocked vertically. When it is desired to rotate or dump the car, the rod 20 may be rotated in such direction as will cause the portion 22 to be retracted from engagement within the loop 18, whereupon the body 9 is free to be rocked vertically. It will also be obvious that this rocking movement of the bar 20 will cause the catch portion 21' to be disengaged from the end gate 22.

The means for controlling the rocking movement of the rod 20 comprises a lever 25, pivoted as at 26 to one end of the car, and a link 27 connects the lower end of the lever with the depending member 23 of the bar 20. A link 28 is arranged on the car body to engage over the end of the lever 25 to hold the latter against rocking movement. It is preferred that the lever 25 be located so as to be capable of being operated without entering between the cars.

As a brace and additional support for the car body, a projection 30 extends outwardly and upwardly from one end of the fifth wheel plate 11, and this projection straddles the bar 20 and is adapted at its extremity to engage the bottom of the car 9. A kingbolt 31 connects the fifth wheel plates.

In order that several of the cars thus constructed when hooked together to form a train may freely move laterally relative to each other, as is necessary in rounding sharp curves, the ends of each car are rounded as shown. It will be observed that the chains, hooks and eyes are arranged upon the car bodies intermediate the longitudinal edges thereof, so that pull will be exerted upon the bodies at the center thereof. This manner of coupling the cars obviates the possibility of overturning of the same when rounding sharp curves. It is also obvious by rounding the ends of the cars the hands of the operator may be inserted between the cars to effect the coupling of the same. By arranging the ends of the cars so as to be convex, the said ends of the adjoining cars will be incapable of engaging each other, either when the train is rounding a sharp curve, or when the car bodies are being rocked upon their pivots to dumping position. Chains 33 and hooks 34 may be used in coupling the cars, and each car may be provided at one end with an eye 35 to receive the hooks of the next adjacent car.

From the foregoing it is obvious that I have provided a mine car which is of extremely simple construction and which is capable of being readily operated. Any of the cars of a train may be dumped, one at a time or all together without abutting the next adjacent car and without danger of derailing the trucks. It is also apparent that the car body may be quickly reversed, and may be locked firmly against oscillating or rotary movement.

While the present is a disclosure of what is believed to be the preferred embodiment of the invention, it is to be understood that the invention is not limited thereto, but that various changes in the minor details of construction, proportion, and arrangement of parts may be resorted to if desired without departing from the spirit of the invention as defined by the appended claims.

I claim:—

1. In a dump car, a truck, a body pivotally and rotatably mounted on said truck, a foot on one end of said body adapted to rest upon said truck, guard members on the sides of said truck for holding said foot against lateral movement, and a latch for holding said foot engaged with said truck.

2. In a dump car, a truck, a body pivotally and rotatably mounted on said truck, a foot on one end of said body adapted to rest on said truck, strap members on the sides of said truck for holding said foot against lateral movement, a pin projecting upwardly from said truck at each end thereof, and between said stops, and the said foot being provided with an aperture to receive one of said pins.

3. In a dump car, a truck, a body rotatably mounted on said truck intermediate the ends thereof, the said truck being provided at each end with a recess, a foot on said body adapted to fit in either of said recesses, a pin on each end of said truck projecting upwardly within each of said recesses, the said foot having an opening to receive one of said pins, the said body being capable of rocking vertically, and means for holding said body against rocking movement.

4. In a dump car, a truck, a body rockably mounted on said truck and capable of rotating thereon, a rotatable rod extending longitudinally of said body, a latch at one end of said rod adapted to engage the door of said body to hold the said door against movement, the opposite end of said rod constituting a latch to hold the said body against rocking movement, and a lever for rotating said rod.

In testimony whereof I affix my signature in presence of two witnesses.

MARTIN S. RUNSVOLD.

Witnesses:
JOHN A. ERICKSON,
HARRY G. E. COOK.